Patented Nov. 4, 1924.

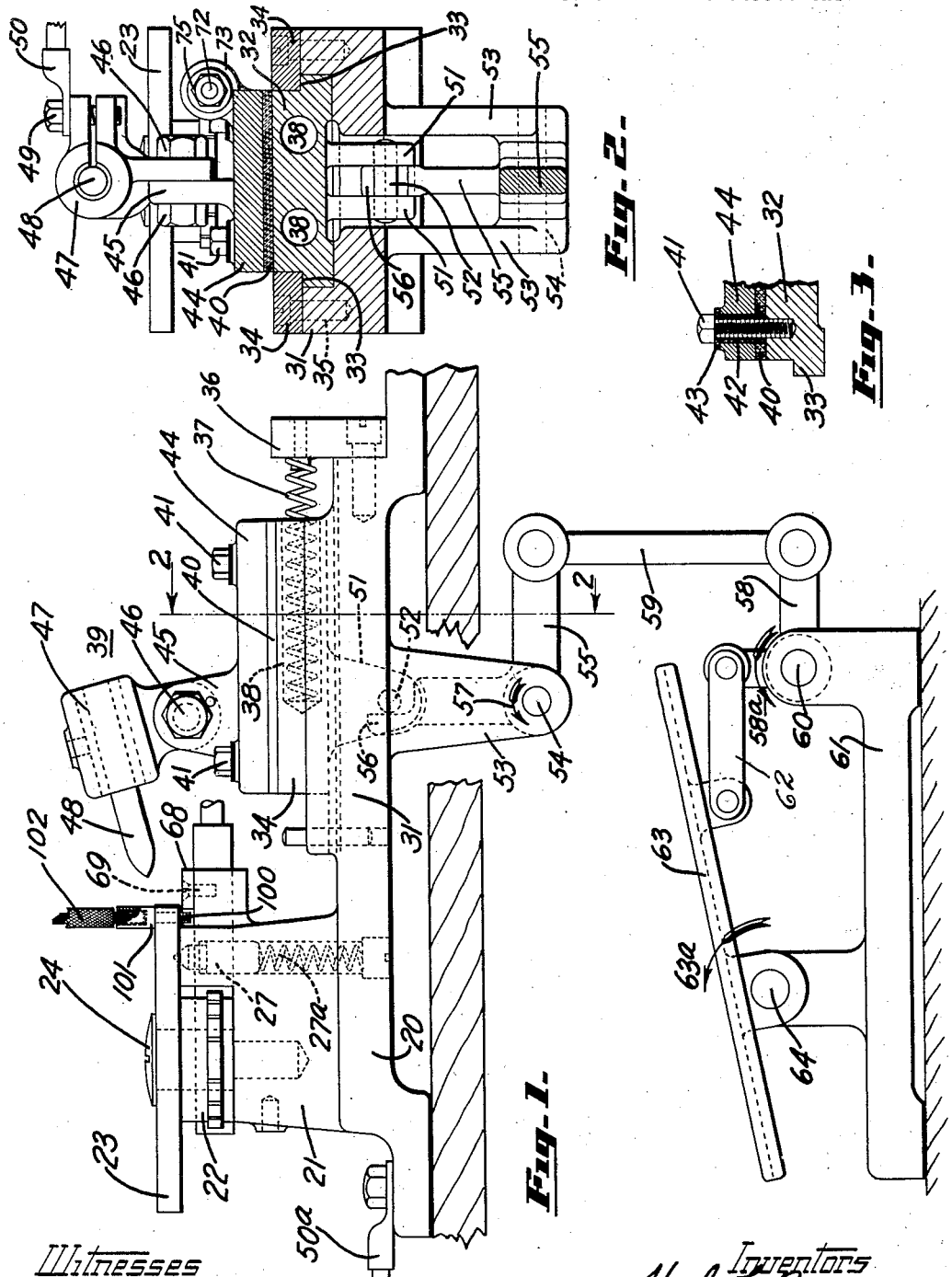

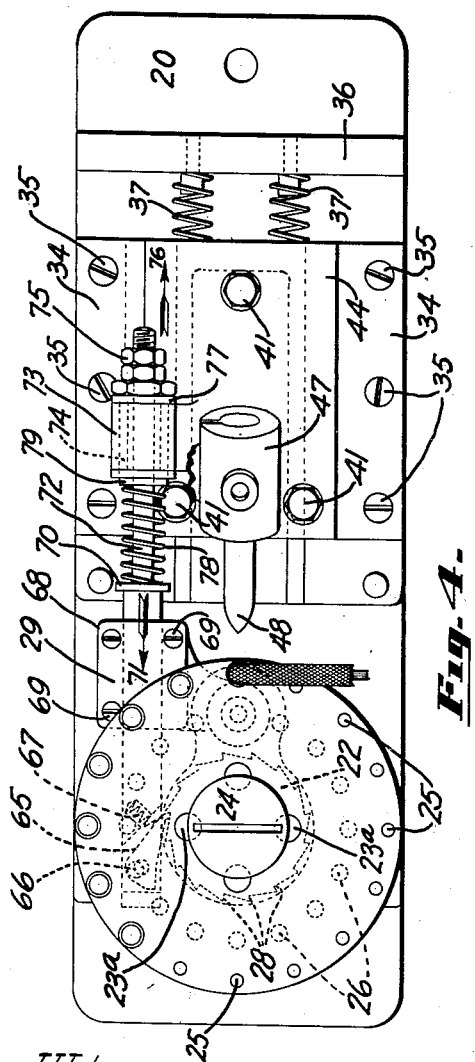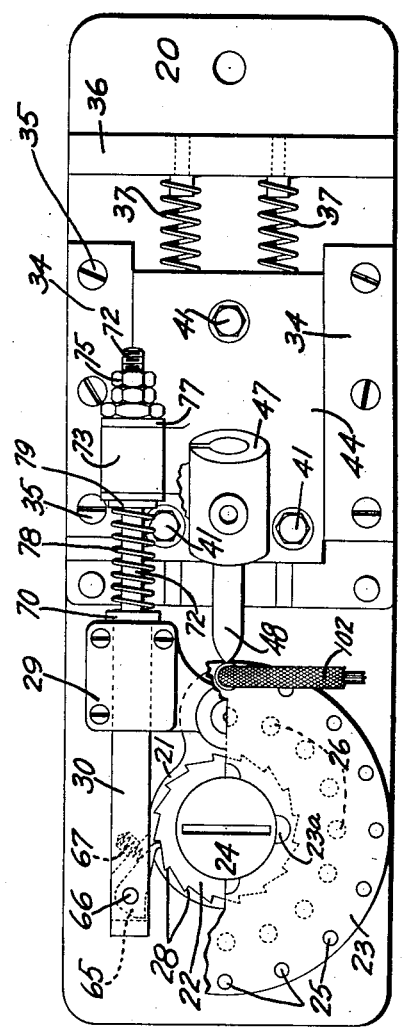

1,514,430

UNITED STATES PATENT OFFICE.

HARL L. BURNS AND RICHARD T. ABRELL, OF DAYTON, OHIO.

ELECTRIC SOLDERING MACHINE.

Application filed June 9, 1921. Serial No. 476,328.

*To all whom it may concern:*

Be it known that we, HARL L. BURNS and RICHARD T. ABRELL, citizens of the United States of America, residing at Dayton, county of Montgomery, State of Ohio, have invented certain new and useful Improvements in Electric Soldering Machines, of which the following is a full, clear, and exact description.

This invention relates to a machine or fixture for facilitating the soldering of articles of manufacture.

It is among the objects of the invention to provide a machine in which by the operation of the foot a heating device may be applied to the work and said work be brought successively into proximity to the heating device and then be moved away therefrom, thereby leaving the hands of the operator free to apply flux and solder and to load and unload the work from the machine.

Another object is to provide a machine including an electrical heating element, the heating element being automatically connected with a current source when the element is applied to the work, whereby to economize current.

Other and further objects of the present invention will be apparent from the following description, reference being had to the accompanying drawings, wherein a preferred embodiment of the present invention is clearly shown.

In the drawings:

Fig. 1 is a side elevation of the machine with its controlling pedal;

Fig. 2 is a section taken along line 2—2 in Fig. 1;

Fig. 3 is a detail sectional view showing the method of insulating the one portion of the heating device from the other;

Fig. 4 is a top view of the machine, the heating device being in normal position; and Fig. 5 is a view similar to Fig. 4, certain parts being broken away to more clearly show other parts of the machine. The heating device in this view is in its operative or heating position.

Referring to the drawings, the numeral 20 designates a base having a platform 21, which supports a ratchet wheel 22. Secured to this ratchet wheel 22 by means of screws 23ª is the work carrier or table 23. These two elements 22 and 23 are held in position on the platform 21 by means of a shouldered screw 24 about which said elements are adapted to rotate. The table 23 may be made of any suitable material. However, it is preferable that a metal be used to which soldering material will not adhere.

A series of equally spaced holes 25 are provided in the table 23, said holes being arranged in a circular row concentric with the axis of the table. Corresponding in number and arrangement with the holes 25 but in a radially smaller row and on the bottom side of the table 23 there are provided indents 26. A plunger 27 pressed upwardly against the table 23 by means of a spring 27ª, is adapted to enter the various indents 26 for causing the table to be successively stopped in a predetermined position for purposes set forth hereinafter.

The ratchet wheel 22 is provided with a series of teeth or notches 28, equidistantly arranged.

Projecting from the platform 21 is a bearing or retainer arm 29 which is adapted to support the shifting lever 30 to be detailedly described later.

The base 20 is also provided with a channeled portion 31 adapted to receive the sliding heating device carrier 32. On each side of this carrier 32 is provided a ledge 33, over which the retaining plate 34, secured to the base 20 by means of screws 35, is adapted to project, thereby preventing the removal of the carrier 32 from the channeled portion 31 of base 20, but permitting said carrier to slide longitudinally therein. A buffer plate 36 is secured to the base 20 and acts as an abutment for one end of the springs 37, the other end of said springs projecting into the channels 38 formed in the carrier 32.

Secured to the carrier 32, but insulated therefrom, is the heating unit 39. By referring to Fig. 3 the method of insulating said heating unit from the carrier may be seen. The plate of insulating material 40 lies between the heating unit and carrier, and the studs 41, which secure said unit to the carrier, are insulated by means of the insulating collar 42 and washer 43. The heating unit 39 comprises a main body portion 44, having a projecting ear 45. Secured to this ear by means of clamping nuts 46, is the heater receptacle 47, which carries the main heating unit 48, held in position in the receptacle 47 by means of clamping stud 49 to which the one terminal connection 50 of the source of electrical energy is secured.

The heating unit carrier 32 is provided with a downwardly projecting pair of ears 51 having a pin 52 passing therebetween. The base 20 is also provided with a pair of downwardly projecting ears 53, having a pin 54 passing therebetween, said pin 54 acting as a fulcrum for the bell crank lever 55. This lever 55 has an upwardly projecting arm 56 which engages with the pin 52 in such a manner that the pressure of the spring 37 interposed between the slidable heating unit carrier 32 and the buffer block 36 will not effect movement of the carrier 32 until the lever 55 including arm 56 has been moved about the pin 54 in the direction of the arrow 57 in Fig. 1. This method of operation will be described fully hereinafter.

Lever 55 is secured to another bell crank lever 58 by means of a connecting link 59. The bell crank lever 58 is fulcrumed on the pin 60 secured to the base 61. A link 62 connects one end of the bell crank lever 58 to a pedal 63 which is fulcrumed on the base 61 at 64. Movement of the pedal in the direction of the arrow 63ª will cause lever 55 to be rotated about its fulcrum pin 54 in the direction of the arrow 57.

As has been mentioned heretofore, the platform 21 has a projecting bearing or retainer arm 29 which is adapted to support the shifting lever 30. This lever is provided with a pawl 65, one end of which is fulcrumed in a channel in the lever 30 by means of a pin 66. The other end of the pawl 65 is held in engagement with the ratchet wheel 22 by means of the spring 67. The lever 30 is held in the channel of arm 29 by means of a cover plate 68 secured to said arm by means of screws 69.

Adjacent to the arm 29 and at a distance therefrom, slightly greater than the distance between the notches 28 on ratchet wheel 22, the lever 30 is provided with an enlarged portion or flange 70, which will permit the lever 30 to move a limited distance in the direction of the arrow 71, see Fig. 4, so that the latch or pawl 65 will tend to engage with the notch next adjacent to the one from which it has been moved by this lateral movement of the lever 30 in the direction of arrow 71. As can be seen in Figs. 4 and 5, the lever 30 has a reduced portion 72 which projects through a hollow arm 73 secured to or formed integral with the body portion 44 of the heating unit 39. This reduced portion of the lever passing through said hollow arm is also insulated therefrom by means of an insulating bushing 74. Adjusting nuts 75 are provided on the end of the lever portion 72 and are adapted to cause the lever 30 to move with the heating unit 39 when it is moved in the direction of arrow 76, see Fig. 4. The nuts 75 are insulated from the hollow arm 73 by means of insulating washer 77. A spring 78 is mounted on the reduced portion 72 of lever 30 and interposed between the flange 70 on lever 30 and an insulating washer 79, abutting against the hollow arm 73 and insulating the spring therefrom.

Having described the structure of the machine, its operation will now be set forth. As has been mentioned before this machine is provided for facilitating the soldering of articles of manufacture. The articles to be soldered are shown in the present application as being electrical terminals to which lead wires or conductors are soldered. In the Fig. 1 a terminal is shown placed in position on the table 23, said terminal comprising a shank portion 100 which projects into one of the holes 25 of table 23. Formed integral with this shank portion is a body portion 101, hollowed out to receive the conductors of wire 102.

When the operator has loaded or filled the holes 25 in table 23 and has applied the flux, preparatory to soldering, he operates the pedal 63 in the direction of the arrow 63ª. This will cause the link 62 to operate the bell crank lever 58 about its fulcrum in the direction of the arrow 58ª, tending to cause the link 59 to push upwardly and operate the bell crank lever 55 in the direction of the arrow 57, causing the arm 56 of lever 55 to be moved away from the pin 52 carried by the sliding heating device carrier 32. This in turn will permit the springs 37, interposed between the carrier 32 and the abutment block 36, to push the carrier 32 in a direction toward the platform 21, causing the carbon 48 of the heating unit 39 to engage with the terminal body 101. The engagement of the carbon 48 with terminal 101 will close the electric circuit between terminal 50, on the heating unit and terminal 50ª connected to the base 20, through the carbon, causing the same to become hot and consequently heat the terminal body 101 preparatory to soldering.

The movement of the carrier 32, in the direction of the platform 21, will also cause the hollow arm 73 to be moved in the same direction which in turn will cause the lever 30 to move therewith due to the interposition of the spring 78 between said hollow arm 73 and the flange portion 70 on the lever 30. As has been mentioned before the flange 70 will permit the lever 30 to be moved in the direction of the arrow 71 slightly more than the distance between the notches 28 on the ratchet wheel 22. Therefore, when said lever is thus moved, the pawl 65 will engage with the next adjacent notch, counter-clockwise to the one it was engaged with previous to the shifting of the lever.

After the operator has finished soldering the terminal engaged with the carbon 48, he operates the pedal 63 in a direction opposite to that described heretofore, causing the carrier 32 to be moved away from the platform 21, thus moving the carbon 48 away from and out of engagement with the terminal on the table 23. This will also cause the lever 30 to be moved in the same direction due to the nuts 75 engaging with the hollow arm 73. This movement of the lever 30 will cause the table 23 to be rotated in a clockwise direction, see Figs. 4 and 5, permitting the plunger 27 to engage with the next adjacent indent 26, thus bringing the next adjacent terminal to the one just finished, in position where the next operation of the pedal to move the carbon 48 in the direction toward the platform 21 will cause said carbon to engage with the said terminal to be finished.

As the terminals are finished the operator removes them from the table 23 and places the unfinished terminals in their place, permitting substantially continuous operation and thus greatly facilitating the production of pieces of work of this kind.

By referring to Fig. 1, it may be seen that the carbon 48 is not directly brought into engagement with the terminal to be heated by means of the operation of the pedal 63 but by the springs 37. The operation of the pedal permits the springs to function thus eliminating the danger of crushing the carbon by undue pressure of the foot on the pedal 63.

The spring 78 acts as an automatic adjustment for varying carbon lengths. That is, the spring 78, lever 72, flange 70 and hollow arm 73 move as a unit until the flange 70 engages with the retainer arm 29, after which, if the carbon is short and does not contact with the terminal to be heated, the further movement of the carrier 32 in the direction of the platform 21 will cause the lever 30 to slide within the insulating bushing 74, in arm 73, thus causing the spring 78 to be compressed until the carbon has engaged with the terminal to be heated.

Continuous movement of the pedal 63 after the carbon has engaged with the terminal to be heated will only result in the moving of the arm 56 away from the pin 52.

Proper adjustments of the carbon can be obtained by loosening the nuts 46.

One of the advantages of the present invention resides in the fact that the entire operation of the machine is brought into effect by the use of the operator's foot, thus permitting the operator free use of his hands for applying soldering flux, then inserting the conductor, applying solder and then removing the finished article and replacing same with one to be completed, without any unnecessary delay to retard the continuous production of articles of this kind.

While the form of mechanism herein shown and described constitutes a preferred form of embodiment of the invention, it is to be understood that other forms might be adopted, all coming within the scope of the claims which follow.

What we claim is as follows:

1. In an electric heating machine including a rotating table adapted to support a plurality of pieces of work and having one terminal of a source of electric energy connected thereto and including also a movable heating device having the other terminal of the electrical energy source connected thereto; resilient means for moving the heating device out of normal position; control means for normally holding the heating device out of work piece engaging position but operable to permit the resilient means to move the heating device into engagement with the work piece for heating same; and automatic means associated with the table and the heating device and adapted to rotate the table to move the heated piece of work out of alignment with the heating device and bring the next adjacent piece of work into alignment with said heating device when the heating device is moved into normal or work piece disengaging position.

2. In an electric heating machine including a rotating table adapted to support a plurality of pieces of work and having one terminal of a source of electrical energy connected thereto and including also a movable heating device having the other terminal of the electrical energy source connected thereto; resilient means for moving the heating device out of normal position; control means for normally holding the heating device out of work piece engaging position but operable to permit the resilient means to move the heating device into engagement with the work piece, thereby closing the circuit from the source of electrical energy and causing the heating device to heat up and in turn heat said work piece; and automatic means associated with the table and the heating device and adapted to rotate the table to move the heated piece of work out of alignment with the heating device and bring the next adjacent piece of work into alignment with said heating device when the heating device is moved into normal or work piece disengaging position.

3. In an electric heating machine including a rotating table adapted to support a plurality of pieces of work and having one terminal of a source of electrical energy connected thereto and including also a movable heating device having the other terminal of the electrical energy source connected thereto; resilient means for moving the heating device out of normal position; control means for normally holding the heating device out of work piece engaging position but operable to permit the resilient means to move the heating device into engagement with the work piece, thereby closing the circuit from the source of electrical energy and causing the heating device to heat up and in turn heat said work piece; automatic means associated with the table and the heating device and adapted to rotate the table to move the heated piece of work out of alignment with the heating device and bring the next adjacent piece of work into alignment with said heating device when the heating device is moved into normal or work piece disengaging position; and automatically adjustable means to compensate for varying lengths of the heating device without affecting the table rotating means.

In testimony whereof we hereto affix our signatures.

HARL L. BURNS.
RICHARD T. ABRELL.

Witnesses:
H. E. SOLLENBERGER,
IRVIN A. GREENWALD.